United States Patent
Hurley et al.

[11] Patent Number: 6,090,884
[45] Date of Patent: Jul. 18, 2000

[54] STARCH DEGRADATION/GRAFT POLYMERIZATION COMPOSITION, PROCESS, AND USES THEREOF

[75] Inventors: Steven M. Hurley; Florence L. Todd; Paul E. Sandvick; Steve E. Danley, all of County of Racine, Wis.

[73] Assignee: S. C. Johnson Commercial Markets, Inc., Sturtevant, Mass.

[21] Appl. No.: 09/074,536

[22] Filed: May 7, 1998

[51] Int. Cl.[7] .............................. C08K 3/30; C08L 3/02; C09D 11/00; C09D 103/02; C09D 103/04
[52] U.S. Cl. .......................... 524/734; 523/160; 523/161; 527/314; 106/31.71
[58] Field of Search ..................... 523/160, 161; 527/312, 313, 314; 524/734; 106/31.71, 31.94

[56] References Cited

U.S. PATENT DOCUMENTS

| | | | |
|---|---|---|---|
| H502 | 8/1988 | Portnoy et al. | 526/200 |
| 3,332,897 | 7/1967 | Chaudhuri | 527/313 |
| 3,640,925 | 2/1972 | Touzinsky et al. | |
| 3,769,248 | 10/1973 | Kovats | 524/734 |
| 4,079,025 | 3/1978 | Young et al. | 525/54.3 |
| 4,131,574 | 12/1978 | Isherwood et al. | |
| 4,131,576 | 12/1978 | Iovine et al. | 527/312 |
| 4,171,407 | 10/1979 | Elser et al. | |
| 4,301,017 | 11/1981 | Kightlinger et al. | |
| 4,322,322 | 3/1982 | Lambrechts et al. | |
| 4,532,295 | 7/1985 | Brabetz et al. | |
| 4,552,970 | 11/1985 | Van Eenam | 527/312 |
| 4,560,724 | 12/1985 | Brabetz et al. | |
| 4,684,708 | 8/1987 | Deets et al. | |
| 4,839,450 | 6/1989 | Fanta et al. | |
| 5,026,746 | 6/1991 | Floyd et al. | |
| 5,055,541 | 10/1991 | Floyd et al. | |
| 5,082,882 | 1/1992 | Pettijohn | |
| 5,095,054 | 3/1992 | Lay et al. | |
| 5,116,890 | 5/1992 | Floyd et al. | |
| 5,116,927 | 5/1992 | Floyd et al. | |
| 5,130,395 | 7/1992 | Nguyen et al. | 527/300 |
| 5,358,998 | 10/1994 | Wendel et al. | |
| 5,403,875 | 4/1995 | Bortnick et al. | |
| 5,432,215 | 7/1995 | Girg et al. | |
| 5,439,953 | 8/1995 | Ritter et al. | |
| 5,523,372 | 6/1996 | Fisk | |
| 5,525,414 | 6/1996 | Wagers et al. | |
| 5,532,300 | 7/1996 | Koubek et al. | |
| 5,536,764 | 7/1996 | Nguyen et al. | |
| 5,536,779 | 7/1996 | Wendel et al. | |
| 5,753,021 | 5/1998 | Martin et al. | 106/31.68 |

FOREIGN PATENT DOCUMENTS

| | | |
|---|---|---|
| 0021542 | 3/1979 | European Pat. Off. . |
| 55-123610 | 3/1979 | Japan . |
| 59115375 | 12/1982 | Japan . |

*Primary Examiner*—Vasu Jagannathan
*Assistant Examiner*—Callie E. Shosho
*Attorney, Agent, or Firm*—Renee J. Rymarz; Warren R. Bovee

[57] ABSTRACT

Disclosed herein are starch stabilized polymeric emulsions. Persulfate salts degrade starch to give it suitable characteristics, and then also, essentially simultaneously, initiate polymerization with monomers. This permits a single reaction condition to be used for both the degradation step and the polymerization step, and avoids the need for use of metallic ions such as iron.

28 Claims, No Drawings

STARCH DEGRADATION/GRAFT POLYMERIZATION COMPOSITION, PROCESS, AND USES THEREOF

CROSS REFERENCES TO RELATED APPLICATIONS

Not applicable.

STATEMENT REGARDING FEDERALLY SPONSORED RESEARCH

Not applicable.

BACKGROUND OF THE INVENTION

The present invention relates to starch/polymer graft emulsions. More particularly, it relates to the formation of such emulsions using persulfate salts to essentially simultaneously degrade the starch and initiate a polymerization.

It is often desirable to use modified starch polymers for coatings, adhesives, and graphic arts applications. By combining starch with synthetic polymers through graft copolymerization, products with highly desirable combinations of properties can be produced. See e.g. U.S. Pat. Nos. 3,640,925 and 4,171,407. The disclosure of these patents, and of all other publications referred to herein, are incorporated by reference as if fully set forth herein.

For particular applications, it is highly desirable that certain metallic ions such as iron, nickel, manganese, cerium, and copper not be present as they tend to discolor the resulting products. This is a particular problem for products used in the graphic arts and coating industries for products such as ink binders and coating binders. It is noted, however, that such metals are typically used in starch graft emulsion copolymer systems, either to degrades starch or facilitate the polymerization.

Another issue arises in connection with batch processing of graft polymerization. One set of conditions is often specified for degrading starch (e.g. to modify its viscosity and other characteristics), and another set of conditions is then used for graft polymerization. Changing the reaction conditions can lead to excessive processing times. In addition, often the reactants used in the degradation process are unnecessary or undesirable in the subsequent graft copolymerization.

Thus, it can be seen that a need exists for improved starch stabilized polymeric emulsions, and methods for making them.

The objects of the present invention therefore include providing an emulsion polymer of the above kind:

(a) that has desired viscosity and other characteristics;

(b) which can be made in a process that uses essentially the same conditions for degrading starch as for polymerizing the emulsion;

(c) which uses environmentally acceptable and inexpensive components; and (d) which is suitable for a wide variety of applications.

These and still other objects and advantages of the present invention will be apparent from the description which follows.

BRIEF SUMMARY OF THE INVENTION

The present invention is directed to a composition capable of forming a starch stabilized polymeric emulsion, and such a starch stabilized polymeric emulsion. The composition includes about 5% to 30% by weight of total solids of a starch, about 1% to 5% by weight of total solids of a persulfate salt and at least about 70% by weight of total solids of an ethylenically unsaturated monomer. Water makes up the balance of the emulsion.

Additionally, the composition may include between about 0.5% and 1% by weight of monomer solids of a surfactant. Such a surfactant is selected from the group consisting of anionic surfactants and nonionic surfactants. Typically, the ethylenically unsaturated monomer is selected from the group consisting of acrylic acid, acrylates, methacrylates and styrenes. The composition may additionally include a pigment.

The composition of the present invention is essentially free of iron. Preferably, the inventive composition is essentially free of iron, nickel, manganese, cerium and copper.

The present invention is also directed to a method of forming a starch stabilized polymeric emulsion. One preferred method of the invention includes the steps of a) allowing a starch to be degraded by a persulfate salt and b) while at least a portion of the starch is still being degraded by the persulfate salt, adding at least one ethylenically unsaturated monomer to the degrading starch to cause the degrading starch to be graft copolymerized with the monomer(s). In a preferred method, the first of the monomers to be added as part of the method is added no earlier than fifteen minutes and no later than thirty minutes after the degradation of the starch begins.

Additionally, the present invention is directed to a coating. Such a coating includes about 10% to 90% by weight of total solids of a starch stabilized polymeric emulsion and about 10% to 90% by weight of total solids of a pigment. The starch stabilized polymeric emulsion comprises or is prepared from about 5% to 30% by weight of total solids of a starch, about 1% to 5% by weight of total solids of a persulfate salt, and at least about 70% by weight of total solids of an ethylenically unsaturated monomer. In preferred embodiments, the coating includes about 10% to 20% by weight of total solids of a starch stabilized polymeric emulsion, and about 80% to 90% by weight of total solids of a pigment. The ethylenically unsaturated monomer is selected from the group consisting of acrylic acid, acrylates, methacrylates and styrenics.

The starch stabilized polymeric emulsion may further include between about 0.5% and 1% by weight of monomer solids of a surfactant. This surfactant is selected from the group consisting of anionic surfactants and nonionic surfactants.

The starch stabilized polymeric emulsion is essentially free of iron and preferably essentially free of not only iron, but also nickel, manganese, cerium and copper. Additionally, the coating may include at least one additive such as defoamers, wetting agents, thickeners, bases, ammonia, and water.

The present invention is also directed to an ink composition. Such an ink composition includes about 10% to 90% by weight of total solids of a starch stabilized polymeric emulsion and about 10% to 90% by weight of total solids of a pigment, and preferably about 10% to 20% by weight of total solids of a starch stabilized polymeric emulsion and about 80% to 90% by weight of total solids of a pigment.

The starch stabilized polymeric emulsion includes about 5% to 30% by weight of total solids of a starch, about 1% to 5% by weight of total solids of a persulfate salt, and at least about 70% by weight of total solids of an ethylenically unsaturated monomer. Such a starch stabilized polymeric emulsion may further include between about 0.5% and 1% by weight of monomer solids of a surfactant. The ethylenically unsaturated monomers useful in the starch stabilized polymeric emulsions used in the ink compositions are preferably selected from the group consisting of acrylic acid, acrylates, methacrylates and styrenics.

The starch stabilized polymeric emulsions useful in the inventive ink compositions are preferably essentially free of iron, and also preferably, essentially free of, nickel, manganese, cerium and copper. Additionally, additives such as defoamers, wetting agents, thickeners, bases, ammonia, and water can also be included in the inventive ink compositions.

DETAILED DESCRIPTION OF THE INVENTION

In one aspect, the invention provides a composition suitable to form a starch stabilized polymeric emulsion. It has 5%–30% by weight of total solids of a starch, 1%–5% by weight of total solids of a persulfate salt, and at least 70% by weight of total solids of an ethylenically unsaturated monomer. A surfactant and/or chain transfer agent can also optionally be included.

The composition is preferably essentially free of iron, nickel, manganese, cerium, and copper (e.g. less than 50 ppm in total, and less than 25 ppm iron).

Examples of suitable starches to use are starches such as hydroxyalkylated starch, oxidized starch, acid modified starch, and cationic starch. Specific examples of hydroxyalkylated starch include hydroxyethylated corn starch and hydroxyethylated potato starch. The most preferred starch is a hydroxyethylated corn starch such as Penford 230 (Penford Products Co., Cedar Rapids Iowa). Preferable starches used in the present invention are those which have not been previously degraded.

Examples of suitable persulfate salts are ammonium, potassium, sodium, and lithium persulfate.

The ethylenically unsaturated monomers can be any ethylenically unsaturated monomer or class of monomers. Examples are acrylate esters and acids, methacrylate esters and acids, acrylonitriles, methacrylonitrile, vinyl aromatic compounds such as styrene, substituted styrenes, vinyl esters of organic acids such as vinyl acetate, acrylamides and methacrylamides.

Specific acrylate esters and acids include but are not limited to acrylic acid, methyl acrylate, ethyl acrylate, n-butyl acrylate, 2-ethylhexyl acrylate, hexyl acrylate, tert-butyl acrylate, lauryl acrylate, tert-butyl acrylate, 2-hydroxyethyl acrylate, and hydroxypropyl acrylate. Also included are other substituted acrylic acids such as crotonic acid, maleic acid, and itaconic acid, as well as esters thereof.

Specific methacrylate esters and acids include but are not limited to methacrylic acid, methyl methacrylate, ethyl methacrylate, n-butyl methacrylate, 2-ethylhexyl methacrylate, hexyl methacrylate, isobutyl methacrylate, isopropyl methacrylate, 2-hydroxyethyl methacrylate and hydroxypropyl methacrylate.

Specific vinyl aromatic compounds include but are not limited to styrene, alpha methyl styrene, para-methyl styrene, vinyl toluene, t-butyl styrene, and vinyl benzyl chloride.

Specific vinyl esters of organic acids include but are not limited to vinyl acetate and vinyl versatate.

Specific acrylamides and methacrylamides include but are not limited to acrylamide, 2-acrylamido-2-methylpropanesulfonic acid, N-(iso-butoxymethyl) acrylamide, n-butoxymethyl acrylamide, n-butyl acrylamide, diacetone acrylamide, n,n-dimethylaminoethyl acrylamide, N-methylol acrylamide, n,n-methacrylamide, n-methyl methylacrylamide, iso-butoxy methaacrylamide, and dimethylaminoethyl methacrylamide.

Other useful monomers also include the above-noted esters, amides and vinyl aromatic compounds in which the substituting group is attached to more than one polymerizable group as, for example, trimethylolpropane trimethacrylate and methylene bis acrylamide. Other useful difunctional monomers are divinyl benzene, ethylene glycol dimethacrylate, and hexanediol diacrylate. Mixtures of the various monomers may also be used to produce graft copolymers.

Highly preferred monomers are acrylic monomers such as acrylic acid, and esters of acrylic acid such as ethyl acrylate, 2-ethylhexyl acrylate, and methyl acrylate. The most preferred ethylenically unsaturated monomers are n-butyl acrylate, methyl methacrylate, methacrylic acid, and styrene.

One can also add a chain transfer agent to assist the polymerization, such as butyl mercaptoproprionate. The function of the chain transfer agent is to regulate the molecular weight of the prepared emulsion polymer. Other chain transfer agents that perform this function are also known to those skilled in the art of emulsion polymerization, e.g. iso-octyl mercaptopropionate and tert-dodecyl mercaptan.

If surfactants are used, the preferred surfactants are anionic and nonionic surfactants. See generally U.S. Pat. No. 5,358,998 and *McCutcheon's Emulsifiers and Detergents*, MC Publishing Co., 1995 Edition. Other types of surfactants such as cationic and zwitterionic surfactants may also be used. Preferred surfactants include sodium lauryl sulfate, and Tergitol® from Union Carbide. The latter is a nonionic surfactant comprised of secondary alcohol ethoxylates having a chain length of 11–15 carbon atoms.

In another embodiment, the invention provides a method of producing a starch stabilized polymeric emulsion. One permits the above composition to copolymerize into a starch/graft copolymer emulsion.

In yet another embodiment, the invention provides a starch stabilized emulsion made from the above method.

The polymer of the present invention is typically prepared by the method of emulsion polymerization, which had previously involved polymerizing a mixture of ethylenically unsaturated copolymerizable monomers in the presence of an aqueous reaction medium, a surfactant, and a free radical initiator. The aqueous reaction medium is the liquid in which the various components are dispersed in an emulsion state and is substantially composed of water.

Alternatively, one can replace the previously thought necessary surfactant component with additional starch.

The process used to prepare the starch graft copolymers can be a free radical addition aqueous emulsion polymerization process performed in a batch, semi-batch, multiple stage batch, multiple stage semi-batch, or continuous emulsion polymerization. However, here the process utilizes a simultaneous starch degradation and monomer polymerization scheme.

Preferably, the polymerization according to the present invention is conducted by semi-batch polymerization. Semi-batch polymerization as applied to the present invention generally involves initially charging into a polymerization vessel a reaction medium such as water (and preferably additional components which facilitate the preparation of a stable dispersion of the prepared polymer in the reaction medium). These components could optimally also include a surfactant. Starch would also be charged at this time.

Other ingredients known in the art such as seed lattices for particle size regulation, monomer precharge for in-situ seed latex preparation, polymer initiators/catalysts/accelerators, chain transfer agents, and chelators for incidental metal removal may also be added. As noted above, iron, manganese, nickel, cerium and copper are not desirable additives in the described process.

With agitation, the water, additives and starch are then heated to a temperature typically ranging from 74° C. to about 85° C. Persulfate, is added, with continued agitation. After some period of time (typically 1 to 30 minutes), a controlled addition of the monomer is commenced, and monomer is added continuously over a prescribed period of time (typically 4 to 90 minutes) with continued agitation. During this time the starch is continuing to degrade and the monomer is converted to a stable dispersion of polymer. Upon completion of the controlled monomer addition, the formed graft copolymer is continuously stirred and maintained at a temperature to facilitate complete consumption of the monomers. Thereafter, the copolymer is cooled, and additional components may be added.

Optional components include defoamers, wetting agents, thickeners, bases, ammonia, or additional water. An inert gas can be used to purge the polymerization reactor of oxygen and can be continued throughout the polymerization process.

In other embodiments, the invention provides a coating or binder. Such a coating composition includes about 10% to 90% by weight of total solids of the above starch stabilized polymeric emulsion and about 10% to 90% pigment. Preferable coatings include about 10% to 20% by weight of total solids of the above starch stabilized polymeric emulsion and about 80% to 90% pigment.

In other embodiments, the invention alternatively can provide an ink composition made by combining the above emulsion with a pigment. Such ink compositions include about 10% to 90% by weight of total solids of the above starch stabilized polymeric emulsion and about 10% to 90% pigment. Preferred ink compositions include about 10% to 20% by weight of total solids of the above starch stabilized polymeric emulsion and about 80% to 90% pigment.

Preferred pigments for use in both the coatings and ink compositions are carbon black and organic pigments such as calcium lithol red and phthalol blue.

The invention is also particularly suitable to be used for inclusion in clear overcoats (overprint varnishes), primer coatings, industrial wood finishes, adhesive applications and ink systems.

Following are several examples of preparations of the polymeric emulsions of the present invention, and coatings and ink compositions of the present invention.

EXAMPLE 1

Emulsion Polymer

To a four neck two liter round bottom flask equipped with thermometer and thermo-regulator (Thermowatch®, Instruments for Research and industry, Cheltenham Pa.), condenser, mechanical agitation, nitrogen purge, and heating mantle, were added 684.5 grams of deionized water and 90.3 grams of starch product, Penford gum 230. With agitation, the temperature was raised to 82° C., whereupon the starch granules solubilized and yielded a viscous solution.

An aqueous ammonium persulfate (APS) solution (7.1 grams APS, 35 grams deionized water) was added with continued agitation. The temperature was maintained at 82° C. for 30 minutes with continued agitation. Tergitol 15-S-7 surfactant (3.25 grams) was added with a deionized water flush of 3 grams, and a mixture of ethylenically unsaturated monomers and chain transfer agent was added by a mechanical pump regularly over 90 minutes, according to the following formula:

| Component | weight (grams) |
| --- | --- |
| Styrene | 162.5 |
| n-butyl acrylate | 162.5 |
| n-butyl mercaptopropionate | 3.25 |

After the monomer addition was complete, the pump was flushed with 12.75 grams of deionized water (into the reactor), and an additional charge of 0.5 grams of APS in 7.1 grams of deionized water was added. The reaction was continuously stirred for an additional hold period of one hour, whereupon the reaction was cooled, an additional charge of 28.1 grams of deionized water was added, and filtered through a 100 micron filter into a glass container. The resulting translucent to milky starch graft emulsion polymer was homogeneous and stable, with no observed flocculation or settlement.

EXAMPLE 2

Emulsion Polymer

To a four neck two liter round bottom flask equipped with thermometer and thermoregulator (Thermowatch®, Instruments for Research and Industry, Chaltenham Pa.), condenser, mechanical agitation, nitrogen purge, and heating mantle, were added 682.3 grams of deionized water and 90.3 grams of starch product, Penford gum 230. With agitation, the temperature was raised to 82° C., whereupon the starch granules solubilized and yielded a viscous solution.

An aqueous ammonium persulfate (APS) solution (7.1 grams APS, 33.7 grams deionized water) was added with continued agitation. The temperature was maintained at 82° C. for 30 minutes with continued agitation. Tergitol® 15-S-7 (3.25 grams) were added with a deionized water flush of 2.4 grams, and a mixture of ethylenically unsaturated monomers and chain transfer agent were added by a mechanical pump regularly over 90 minutes, according to the following formula:

| Component | weight (grams) |
| --- | --- |
| Styrene | 308.80 |
| acrylic acid | 16.25 |
| n-butyl mercaptopropionate | 3.25 |

After the monomer addition was complete, the pump was flushed with 15.7 grams of deionized water (into the reactor), and an additional charge of 0.5 grams of APS in 7.1 grams of deionized water was added. The reaction was continuously stirred for an additional hold period of one hour, whereupon the reaction was cooled, an additional charge of 12.6 grams of deionized water was added, and a solution of 0.36 grams of Kathon LX-14 (a biocide made by Rohm & Haas) in 6.8 grams of deionized water was added. The reaction was filtered through a 100 micron filter into a glass container. The resulting translucent to milky starch graft emulsion polymer was homogenous and stable, with no observed flocculation or settlement.

EXAMPLE 3

Emulsion Polymer

To a four neck two liter round bottom flask equipped with thermometer and thermoregulator (Thermowatch®, Instruments for Research and Industry, Cheltenham Pa.), condenser, mechanical agitation, nitrogen purge, and heating mantle, were added 694.8 grams of deionized water and 91.0 grams of starch product, Penford gum 230. With agitation, the temperature was raised to 82° C., whereupon the starch granules solubilized and yielded a viscous solution. An aqueous ammonium persulfate (APS) solution (7.2 grams APS, 35.2 grams deionized water) was added with continued agitation. The temperature was maintained at 82° C. for 30 minutes with continued agitation, and a mixture of ethylenically unsaturated monomers and chain transfer agent were added by a mechanical pump regularly over 90 minutes, according to the following formula:

| Component | weight (grams) |
| --- | --- |
| n-butyl acrylate | 65.5 |
| methyl methacrylate | 65.5 |
| Styrene | 98.3 |
| methacrylic acid | 98.3 |
| n-butyl mercaptopropionate | 3.3 |

The reaction was continuously stirred for an additional hold period of one hour, whereupon the reaction was cooled, and an additional charge of 28.1 grams of deionized water was added. The reaction was filtered through a 100 micron filter into a glass container. The resulting translucent to milky starch graft emulsion polymer was homogeneous and stable, with no observed flocculation or settlement.

Importantly, it should be appreciated that the degradation procedure described above can take place under essentially the same conditions as the polymerization procedure described above. Thus, an essentially simultaneous degradation/copolymerization can be accomplished. This provides reduced overall process times, and eliminates the need for undesirable additives in the finished emulsion polymer.

EXAMPLE 4

Pigment

A base grind composition was prepared from the following formula:

| Component | description | weight (grams) |
| --- | --- | --- |
| carbon black | Black Pearls ® 490 (Cabot Corp., Billerica MA) | 50 |
| grind vehicle | Polymer from Example 3, neutralized to 100% of carboxyls with aqueous ammonia, final solids 15% | 83.3 (12.5 g solids) |
| Water | Tap water | 115.4 |
| Defoamer | Surfynol ® DF58 (Air Products, Allentown, PA) | .5 |

The dispersion of the carbon black in water was obtained by placing 750 grams of 12 millimeter steel ball grinding medium into a pint size tin can, adding the above formula to the can, sealing the can, and placing it on a roller mill (US Stoneware Corp., East Palestine, Ohio) for 16 hours. The resulting base grind was stable, uniform and fluid, with no settlement or flocculated material.

EXAMPLE 5

Emulsion Polymer Pigment

The pigment prepared in Example 4 was used to prepare a black ink according to the following formulation:

| Component | Description | Weight (grams) |
| --- | --- | --- |
| base grind vehicle | Dispersion from Example 4 | 80.0 |
| let down vehicle | Polymer from example 3, neutralized to 100% of carboxyls with aqueous ammonia, final solids 15% | 12.1 |
| water | Tap water | 7.9 |

The final black ink formulation was prepared by weighing the base grind into a 4-ounce glass jar, adding the let down vehicle with mechanical agitation (approximately 600 rpm) over several minutes, followed by addition of the deionized water with continued agitation. Mixing was continued until homogeneous. The resulting aqueous ink was stable to settlement and contained no grainy material.

The suitability of this aqueous ink was evaluated by preparing coated Kraft substrates, obtained by casting the ink onto the Kraft (3NT-5 paper, Leneta Colo., Mahwah N.J.) 12 using a standard laboratory ink applicator (165-p handpoofer). Blackened surfaces obtained in this manner using the ink as described in this example were uniform and showed color strength, transfer and holdout equivalent to or better than a standard commercial product.

EXAMPLE 6

Paper Primer

A primer coating for porous paper surfaces was illustrated in the following manner. The starch graft copolymer prepared in Example 1 was coated onto 40 pound (40 pounds of paper weight per 1000 sq. inches of paper surface) Kraft using an automatic laboratory coater (K-Coater, Gardner Co. Pompano Beach Fla.) using a #1 K-coater application rod at 10 speed setting (approximately 4 feet/minute draw velocity). A secondary coating of Joncryl® 77 from S.C. Johnson Polymer (diluted to 100 cps with deionized water) as the top coat followed, using identical application conditions. This primer/topcoat construction was compared to a similar construction having 2 coats of the Joncryl® 77, and is summarized in the following table:

| sample | paper color | pinholing |
| --- | --- | --- |
| primer/top coat | No paper discoloration; no penetration of coating into paper fibers | no pinholes, uniform coating of surface |
| 2 coats of top coat | Discolored, penetration of liquid coating into paper fibers | pinholes, less than full surface coverage by coatings |

The starch graft emulsion polymers prepared by the present invention have applicability in a number of other coating and ink applications. It will be apparent that the foregoing examples illustrate certain preferred embodiments and are not limitative of scope. Accordingly, such alternatives, changes and modifications are to be considered as forming a part of the invention insofar as they fall within the spirit and scope of the appended claims.

Industrial Applicability

The invention provides a low cost starch polymeric emulsion useful in connection with graphic arts materials, coatings, and adhesives. It is especially useful as a pigment dispersant or ink binder component in graphic arts applications.

We claim:

1. A composition capable of forming a starch stabilized polymeric emulsion, comprising:
   about 5% to 30% by weight of total solids of an undegraded starch;
   about 1% to 5% by weight of total solids of a persulfate salt; and
   at least about 70% by weight of total solids of an ethylenically unsaturated monomer.

2. The composition of claim 1, further comprising between about 0.5% and 1% by weight of the ethylenically unsaturated monomer of a surfactant.

3. The composition of claim 2, wherein the surfactant is selected from the group consisting of anionic surfactants and nonionic surfactants.

4. The composition of claim 1, wherein the composition is essentially free of iron, nickel, manganese, cerium and copper.

5. The composition of claim 1, wherein the composition is essentially free of iron.

6. The composition of claim 1, wherein the ethylenically unsaturated monomer is selected from the group consisting of acrylic acid, acrylates, methacrylates and styrenes.

7. The composition of claim 1, further comprising a pigment.

8. A method of forming a starch stabilized polymeric emulsion, comprising the steps of:
   allowing the starch of claim 1 to be degraded by the persulfate salt; and
   while at least a portion of said starch is still being degraded by the claim 1 persulfate salt, adding claim 1 monomers to the degrading starch to cause the degrading starch to be graft copolymerized with the monomers.

9. The method of claim 8, wherein the first of the monomers to be added as part of the method are added no earlier than fifteen minutes and no later than thirty minutes after the degradation of the starch begins.

10. A starch stabilized polymeric emulsion made by the claim 8 method.

11. A coating, comprising: the emulsion made by the claim 8 method; and a pigment.

12. A starch stabilized polymeric emulsion formed from the claim 1 composition.

13. A coating comprising:
   about 10% to 90% by weight of total solids of a starch stabilized polymeric emulsion comprising about 5% to 30% by weight of total solids of an undegraded starch, about 1% to 5% by weight of total solids of a persulfate salt, and at least about 70% by weight of total solids of an ethylenically unsaturated monomer; and
   about 10% to 90% by weight of total solids of a pigment.

14. The coating of claim 13 preferably comprising:
   about 10% to 20% by weight of total solids of a starch stabilized polymeric emulsion comprising about 5% to 30% by weight of total solids of a starch, about 1% to 5% by weight of total solids of a persulfate salt, and at least about 70% by weight of total solids of an ethylenically unsaturated monomer; and
   about 80% to 90% by weight of total solids of a pigment.

15. The coating of claim 13, wherein the starch stabilized polymeric emulsion further comprises between about 0.5% and 1% by weight of monomer solids of a surfactant.

16. The coating of claim 15, wherein the surfactant is selected from the group consisting of anionic surfactants and nonionic surfactants.

17. The coating of claim 13, wherein the starch stabilized polymeric emulsion is essentially free of iron, nickel, manganese, cerium and copper.

18. The coating of claim 13, wherein the starch stabilized polymeric emulsion is essentially free of iron.

19. The coating of claim 13, wherein the ethylenically unsaturated monomer is selected from the group consisting of acrylic acid, acrylates, methacrylates and styrenes.

20. The coating of claim 13, further comprising at least one additive selected from a) defoamers, b) wetting agents, c) thickeners, d) bases, e) ammonia, and f) water.

21. An ink composition comprising:
   about 10% to 90% by weight of total solids of a starch stabilized polymeric emulsion comprising about 5% to 30% by weight of total solids of an undegraded starch, about 1% to 5% by weight of total solids of a persulfate salt, and at least about 70% by weight of total solids of an ethylenically unsaturated monomer; and
   about 10% to 90% by weight of total solids of a pigment.

22. The ink composition of claim 21 preferably comprising:
   about 10% to 20% by weight of total solids of a starch stabilized polymeric emulsion comprising 5% to 30% by weight of total solids of a starch, about 1% to 5% by weight of total solids of a persulfate salt, and at least about 70% by weight of total solids of an ethylenically unsaturated monomer; and
   about 80% to 90% by weight of total solids of a pigment.

23. The ink composition of claim 21, wherein the starch stabilized polymeric emulsion further comprises between about 0.5% and 1% by weight of the ethylenically unsaturated monomer of a surfactant.

24. The ink composition of claim 23, wherein the surfactant is selected from the group consisting of anionic surfactants and nonionic surfactants.

25. The ink composition of claim 21, wherein the starch stabilized polymeric emulsion is essentially free of iron, nickel, manganese, cerium and copper.

26. The ink composition of claim 21, wherein the starch stabilized polymeric emulsion is essentially free of iron.

27. The ink composition of claim 21, wherein the ethylenically unsaturated monomer is selected from the group consisting of acrylic acid, acrylates, methacrylates and styrenics.

28. The ink composition of claim 21, further comprising at least one additive selected from a) defoamers, b) wetting agents, c) thickeners, d) bases, e) ammonia, and f) water.

* * * * *

UNITED STATES PATENT AND TRADEMARK OFFICE
CERTIFICATE OF CORRECTION

PATENT NO : 6,090,884
DATED : July 18, 2000
INVENTOR(S) : Hurley, et al.

It is certified that error appears in the above-identified patent and that said Letters Patent are hereby corrected as shown below:

Title page, under "References Cited U.S. PATENT DOCUMENTS", please replace reference "H502" with --H507--.

Title page, under "References Cited U.S. PATENT DOCUMENTS", please replace reference "4,552,970" with --4,552,940--.

Column 1, line 35, replace "degrades" with --degrade--.

Column 8, line 21, remove the numeral "12".

Signed and Sealed this

Tenth Day of April, 2001

*Attest:*

NICHOLAS P. GODICI

*Attesting Officer*  Acting Director of the United States Patent and Trademark Office